(12) United States Patent
Kobayashi et al.

(10) Patent No.: US 12,253,141 B2
(45) Date of Patent: Mar. 18, 2025

(54) V-RIBBED BELT

(71) Applicant: BANDO CHEMICAL INDUSTRIES, LTD., Kobe (JP)

(72) Inventors: Shogo Kobayashi, Kobe (JP); Yuya Shindo, Kobe (JP)

(73) Assignee: BANDO CHEMICAL INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/704,158

(22) Filed: Mar. 25, 2022

(65) Prior Publication Data

US 2022/0316554 A1 Oct. 6, 2022

(30) Foreign Application Priority Data

Mar. 31, 2021 (JP) ................... 2021-061066

(51) Int. Cl.
*F16G 5/20* (2006.01)
*F16G 5/08* (2006.01)

(52) U.S. Cl.
CPC ............. *F16G 5/20* (2013.01); *F16G 5/08* (2013.01)

(58) Field of Classification Search
CPC .................................. F16G 5/20; F16G 5/08
USPC ........................................................ 474/267
See application file for complete search history.

(56) References Cited

U.S. PATENT DOCUMENTS

| | | | | |
|---|---|---|---|---|
| 2,519,590 A | * | 8/1950 | Mitchell | F16G 1/08 474/267 |
| 4,708,702 A | * | 11/1987 | Robecchi | F16G 5/06 474/263 |
| 5,776,026 A | * | 7/1998 | Tajima | B29D 29/08 474/271 |
| 6,238,314 B1 | * | 5/2001 | Tajima | F16G 5/06 474/260 |
| 6,419,605 B1 | * | 7/2002 | Takahashi | F16G 5/20 474/237 |
| 6,482,118 B1 | * | 11/2002 | Watanabe | F16G 5/20 474/263 |
| 7,896,767 B2 | * | 3/2011 | Nakashima | F16G 5/04 474/263 |

(Continued)

FOREIGN PATENT DOCUMENTS

| | | | | |
|---|---|---|---|---|
| DE | 60222533 T2 | * | 6/2008 | ............... F16G 5/20 |
| JP | S58-133638 U | | 9/1983 | |

(Continued)

OTHER PUBLICATIONS

WO 2019193881 A1 English Translation from EPO website (Year: 2019).*

(Continued)

*Primary Examiner* — Henry Y Liu
(74) *Attorney, Agent, or Firm* — Faegre Drinker Biddle & Reath LLP (57) ABSTRACT

A V-ribbed belt includes a plurality of V-shaped ribs, each of the plurality of V-shaped ribs includes a V-shaped rib body formed from a rubber composition and a rib-side reinforcing fabric covering a surface of the V-shaped rib body, the rib-side reinforcing fabric is a woven fabric containing a first fiber and a second fiber, and in the woven fabric, at least either the first fiber or the second fiber is inclined relative to a longitudinal direction and a width direction of the belt.

9 Claims, 10 Drawing Sheets

(56) References Cited

U.S. PATENT DOCUMENTS

| | | | | |
|---|---|---|---|---|
| 7,909,719 | B2* | 3/2011 | Leighton | B65G 15/38 |
| | | | | 474/264 |
| 8,475,310 | B2* | 7/2013 | Shiriike | F16G 5/06 |
| | | | | 474/238 |
| 9,341,233 | B2* | 5/2016 | Mori | D03D 3/02 |
| 9,702,434 | B2* | 7/2017 | Takahashi | C08J 5/04 |
| 2014/0364262 | A1* | 12/2014 | Mori | D03D 3/02 |
| | | | | 474/265 |
| 2019/0177889 | A1* | 6/2019 | Gao | F16G 5/20 |
| 2019/0178338 | A1* | 6/2019 | Gao | D03D 1/0094 |
| 2019/0178339 | A1* | 6/2019 | Gao | F16G 5/08 |
| 2019/0178340 | A1* | 6/2019 | Bier | F16G 5/08 |
| 2020/0217396 | A1* | 7/2020 | Tamura | F16G 5/10 |

FOREIGN PATENT DOCUMENTS

| | | | |
|---|---|---|---|
| JP | H05-222667 A | 8/1993 | |
| JP | 2002-235805 A | 8/2002 | |
| JP | 2004-169883 A | 6/2004 | |
| JP | 2010-539394 A | 12/2010 | |
| JP | 2013-213576 A | 10/2013 | |
| JP | 2014-095452 A | 5/2014 | |
| JP | 2016205625 A * | 12/2016 | F16G 5/08 |
| JP | 2017-166633 A | 9/2017 | |
| WO | WO-2009/034748 A1 | 3/2009 | |
| WO | WO-2019069842 A1 * | 4/2019 | B29D 29/103 |
| WO | WO-2019193881 A1 * | 10/2019 | |

OTHER PUBLICATIONS

DE 60222533 T2 Lance L (Year: 2008).*

Extended European search report issued in European patent application No. 22165036.9, dated Sep. 2, 2022.

\* cited by examiner

V-RIBBED BELT

TECHNICAL FIELD

The present invention relates to a V-ribbed belt.

This application claims priority on Japanese Patent Application No. 2021-061066 filed on Mar. 31, 2021, the entire content of which is incorporated herein by reference.

BACKGROUND ART

Conventionally, as a means for transmitting rotational power of an engine, a motor, or the like, a method in which pulleys are fixedly provided on rotation shafts on a driving side and a driven side, respectively, and a transmission belt such as a V-ribbed belt is trained around each pulley, has been widely used.

In a V-ribbed belt, the surfaces of V-shaped ribs are covered with a reinforcing fabric.

As a V-ribbed belt in which the surfaces of V-shaped ribs are covered with a reinforcing fabric, for example, PATENT LITERATURE 1 proposes a V-ribbed belt characterized in that the surfaces of ribs are covered with canvas, the canvas is stretchable in two predetermined directions, a belt matrix of the V-ribbed belt penetrates the mesh of the canvas, the V-ribbed belt is manufactured using a molding method, the surfaces of the ribs are molded by vulcanizing the belt matrix while pressing the canvas, which is placed on the outer periphery of the belt matrix, together with the belt matrix against a mold having a multi-ribbed shape and provided on the inner peripheral surface of a shell in the molding method, and the canvas is stretchable so as to fit the multi-ribbed shape.

PATENT LITERATURE 1 states that a woven fabric can be used as the canvas.

CITATION LIST

Patent Literature

PATENT LITERATURE 1: Japanese Laid-Open Patent Publication (translation of PCT application) No. 2010-539394

SUMMARY OF THE INVENTION

Technical Problem

In the invention described in PATENT LITERATURE 1, when a woven fabric is selected as the canvas and the V-ribbed belt is manufactured using the method of PATENT LITERATURE 1, the woven fabric is not molded along the surfaces of the V-shaped ribs, and wrinkles occur in the woven fabric provided on the surfaces of the V-shaped ribs in some cases.

Solution to Problem

The present invention has been made in view of such circumstances, and an object of the present invention is to provide a V-ribbed belt in which a woven fabric covering a V-shaped rib body is molded without causing wrinkles.

(1) A V-ribbed belt according to the present invention is a V-ribbed belt including a plurality of V-shaped ribs, wherein
each of the plurality of V-shaped ribs includes a V-shaped rib body formed from a rubber composition and a rib-side reinforcing fabric covering a surface of the V-shaped rib body,
the rib-side reinforcing fabric is a woven fabric containing a first fiber and a second fiber, and
in the woven fabric, at least either the first fiber or the second fiber is inclined relative to a longitudinal direction and a width direction of the belt.

The V-ribbed belt includes the rib-side reinforcing fabric made of the woven fabric, and the rib-side reinforcing fabric made of the woven fabric covers the surface of the V-shaped rib body in a predetermined direction. Therefore, in the V-ribbed belt, the rib-side reinforcing fabric covers the surface of the V-shaped rib body without causing wrinkles.

In addition, in the V-ribbed belt, the woven fabric is used as the rib-side reinforcing fabric. Therefore, the V-ribbed belt has better wear durability for the rib-side surface which comes into contact with a rib pulley, as compared to the case where a knitted fabric is used as the rib-side reinforcing fabric.

(2) In the V-ribbed belt, preferably,
the first fiber is more difficult to stretch than the second fiber, and
at least the first fiber is inclined relative to the longitudinal direction of the belt.

It becomes easy to cover the surface of the V-shaped rib body with the rib-side reinforcing fabric without causing wrinkles.

Here, the difficulty of the fiber to stretch is evaluated by an elongation at break when a tensile test is performed under the same conditions. In the present invention, a fiber having a smaller elongation at break is considered as a fiber that is more difficult to stretch.

In the present invention, the first fiber and the second fiber contained in the woven fabric are preferably a warp and a weft, respectively.

(3) In the V-ribbed belt, an angle of a direction of the first fiber with respect to the longitudinal direction of the belt is preferably greater than 5° and not greater than 45°.

In this case, it becomes easier to cover the surface of the V-shaped rib body with the rib-side reinforcing fabric made of the woven fabric, without causing wrinkles.

(4) In the V-ribbed belt, the rib-side reinforcing fabric preferably has a thickness of not less than 0.1 mm and not greater than 0.8 mm.

This case is more suitable for molding the rib-side reinforcing fabric along the rib shape without wrinkles while ensuring the thickness of the rib-side reinforcing fabric.

(5) In the V-ribbed belt, the woven fabric preferably contains a cellulose-based fiber as a main fiber.

The cellulose-based fiber has excellent water absorbing performance. Therefore, the V-ribbed belt is suitable for use as a belt used in a watery environment.

Advantageous Effects of the Invention

In the V-ribbed belt according to the present invention, the rib-side reinforcing fabric made of the woven fabric is provided. Therefore, the wear durability of the rib-side surface which comes into contact with a rib pulley is good.

DETAILED DESCRIPTION

Hereinafter, an embodiment of the present invention will be described with reference to the drawings.

(V-Ribbed Belt)

Figure 1:
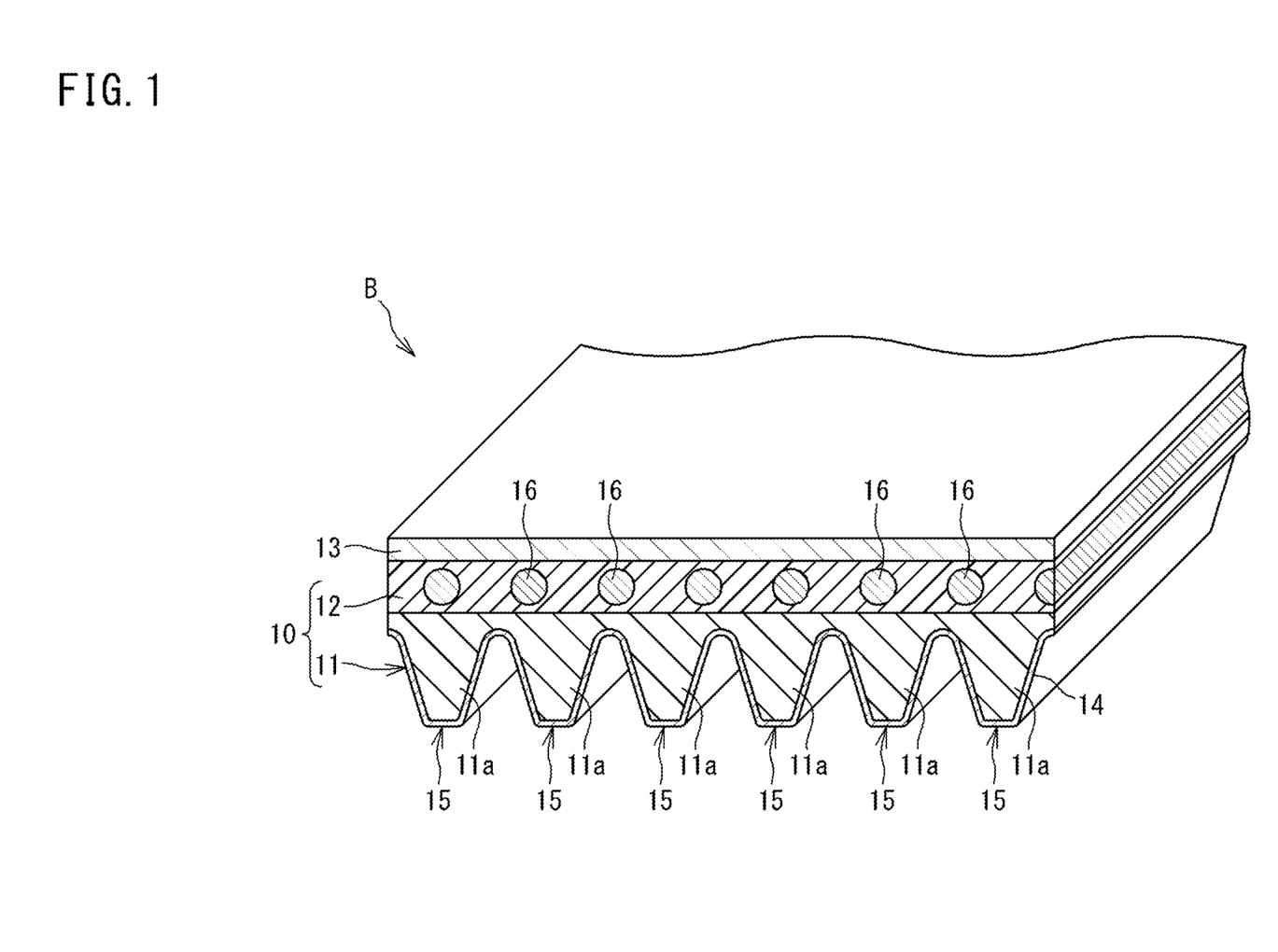
FIG. 1 is a diagram schematically showing a part of a V-ribbed belt according to one embodiment of the present invention.

FIG. 1 is a diagram schematically showing a part of a V-ribbed belt B according to one embodiment of the present invention.

The V-ribbed belt B is used, for example, for an auxiliary driving belt transmission device provided in an automotive engine compartment, and has a belt circumference of not less than 700 mm and not greater than 3000 mm, a belt width of not less than 10 mm and not greater than 36 mm, and a belt thickness of not less than 3.5 mm and not greater than 5.0 mm.

The V-ribbed belt B includes a double-layered belt body 10 including a compression rubber layer 11 on the belt inner peripheral side and an adhesive rubber layer 12 on the belt outer peripheral side. A backface reinforcing fabric 13 is attached to the surface on the belt outer peripheral side of the belt body 10. A rib-side reinforcing fabric 14 formed from a woven fabric is provided on the surface on the rib side of the belt body 10. In addition, a core wire 16 is embedded in the adhesive rubber layer 12 so as to form a helical pattern having a pitch in the belt width direction.

A plurality of V-shaped rib bodies 11a are formed on the compression rubber layer 11 so as to protrude on the inner peripheral side. The plurality of V-shaped rib bodies 11a are each formed as a ridge having a substantially inverted triangular cross section and extending in the belt longitudinal direction, and are aligned in the belt width direction. The thickness of the compression rubber layer 11 is, for example, not less than 2.2 mm and not greater than 3.2 mm.

The adhesive rubber layer 12 is formed in a belt shape having a horizontally long rectangular cross section. The thickness of the adhesive rubber layer 12 is, for example, not less than 1.0 mm and not greater than 2.5 mm.

The backface reinforcing fabric 13 is formed from, for example, a woven fabric, a knitted fabric, a non-woven fabric, or the like, using yarns made of cotton, polyamide fibers, polyester fibers, aramid fibers, or the like. The woven fabric is, for example, plain-woven, twilled, or sateen-woven.

In order to provide adhesiveness with respect to the belt body 10, the backface reinforcing fabric 13 may be subjected to an adhesion treatment. Examples of the adhesion treatment include an adhesion treatment of immersion in an epoxy resin solution or an isocyanate resin solution and heating, an adhesion treatment of immersion in an RFL aqueous solution and heating, an adhesion treatment of immersion in rubber cement and drying, and an adhesion treatment of coating a surface, which is to be the adhesive rubber layer 12 side, with rubber cement and drying the surface. These adhesion treatments may be adopted individually, or two or more of these adhesion treatments may be adopted in combination.

The thickness of the backface reinforcing fabric 13 is, for example, not less than 0.4 mm and not greater than 1.2 mm.

Instead of the backface reinforcing fabric 13, a backface rubber layer having a thickness of, for example, not less than 0.4 mm and not greater than 0.8 mm may be provided. From the viewpoint of suppressing generation of sound during back-surface driving, the grain of a woven fabric may be transferred to the surface of the backface rubber layer.

Each of the compression rubber layer 11 and the adhesive rubber layer 12 is formed from a rubber composition containing a crosslinked rubber component. The rubber composition is a crosslinked product obtained by heating and pressurizing an uncrosslinked rubber composition (raw material composition) obtained by blending and kneading various rubber compounding ingredients including a crosslinking agent with a rubber component; and crosslinking the rubber component by the crosslinking agent.

The compression rubber layer 11 and the adhesive rubber layer 12 may be formed from the same rubber composition, or may be formed from different rubber compositions.

In the case where a backface rubber layer is provided, the backface rubber layer may be formed from the same rubber composition as that of either one of or both the compression rubber layer 11 and the adhesive rubber layer 12, or may be formed from a rubber composition different from those of the compression rubber layer 11 and the adhesive rubber layer 12. In the case where the V-ribbed belt B has a backface rubber layer, from the viewpoint of suppressing occurrence of adhesion due to contact between the belt backface and a flat pulley, the backface rubber layer is preferably formed from a rubber composition slightly harder than that of the adhesive rubber layer 12.

Examples of the rubber component included in the raw material composition include: ethylene-α-olefin elastomers such an ethylene-propylene-diene terpolymer (EPDM), an ethylene-propylene copolymer (EPM), an ethylene-butene copolymer (EDM), and an ethylene-octene copolymer (EOM); chloroprene rubber (CR); chlorosulfonated polyethylene rubber (CSM); and hydrogenated acrylonitrile rubber (H-NBR). As the rubber component, one or more of these rubbers are preferably used, and ethylene-α-olefin elastomers are more preferably used, and EPDM is further preferably used.

Examples of the crosslinking agent included in the raw material composition include sulfur and an organic peroxide.

Examples of rubber compounding ingredients other than the crosslinking agent include a reinforcing material such as carbon black, a filler, an antioxidant, a softener, a vulcanization accelerator, a vulcanization accelerator aid, and a co-crosslinking agent.

In addition, the raw material composition may contain a short fiber. However, preferably, the raw material composition forming the adhesive rubber layer 12 does not contain a short fiber from the viewpoint of adhesiveness to the core wire 16.

The blending formula of the raw material composition used for forming the adhesive rubber layer 12 may be different from that of the raw material composition used for forming the compression rubber layer 11.

The surfaces of the plurality of V-shaped rib bodies 11a of the compression rubber layer 11 are covered with the rib-side reinforcing fabric 14. V-shaped ribs 15 are formed by the V-shaped rib bodies 11a covered with the rib-side reinforcing fabric 14. The surface of each V-shaped rib 15 covered with the rib-side reinforcing fabric 14 serves as a pulley contact surface. Each V-shaped rib 15 has, for example, a rib height of not less than 2.0 mm and not greater than 3.0 mm, and the width between the base ends thereof is, for example, not less than 1.0 mm and not greater than 3.6 mm. The number of V-shaped ribs 15 is, for example, not less than three and not greater than ten (six in FIG. 1).

The thickness of the rib-side reinforcing fabric 14 at the rib-side surface of the V-ribbed belt B is preferably not less than 0.1 mm and not greater than 0.8 mm.

If the thickness of the rib-side reinforcing fabric 14 is less than 0.1 mm, the rib-side reinforcing fabric 14 may wear early due to insufficient strength. On the other hand, if the thickness exceeds 0.8 mm, the moldability of the rib-side reinforcing fabric 14 may be deteriorated and the rib shape may be distorted.

As the thickness of the rib-side reinforcing fabric 14 at the surface of the V-shaped rib body 11a, the thickness of the fiber portion from the surface layer is measured on a cut surface using a microscope.

The rib-side reinforcing fabric 14 is formed from a woven fabric.

Figure 2:
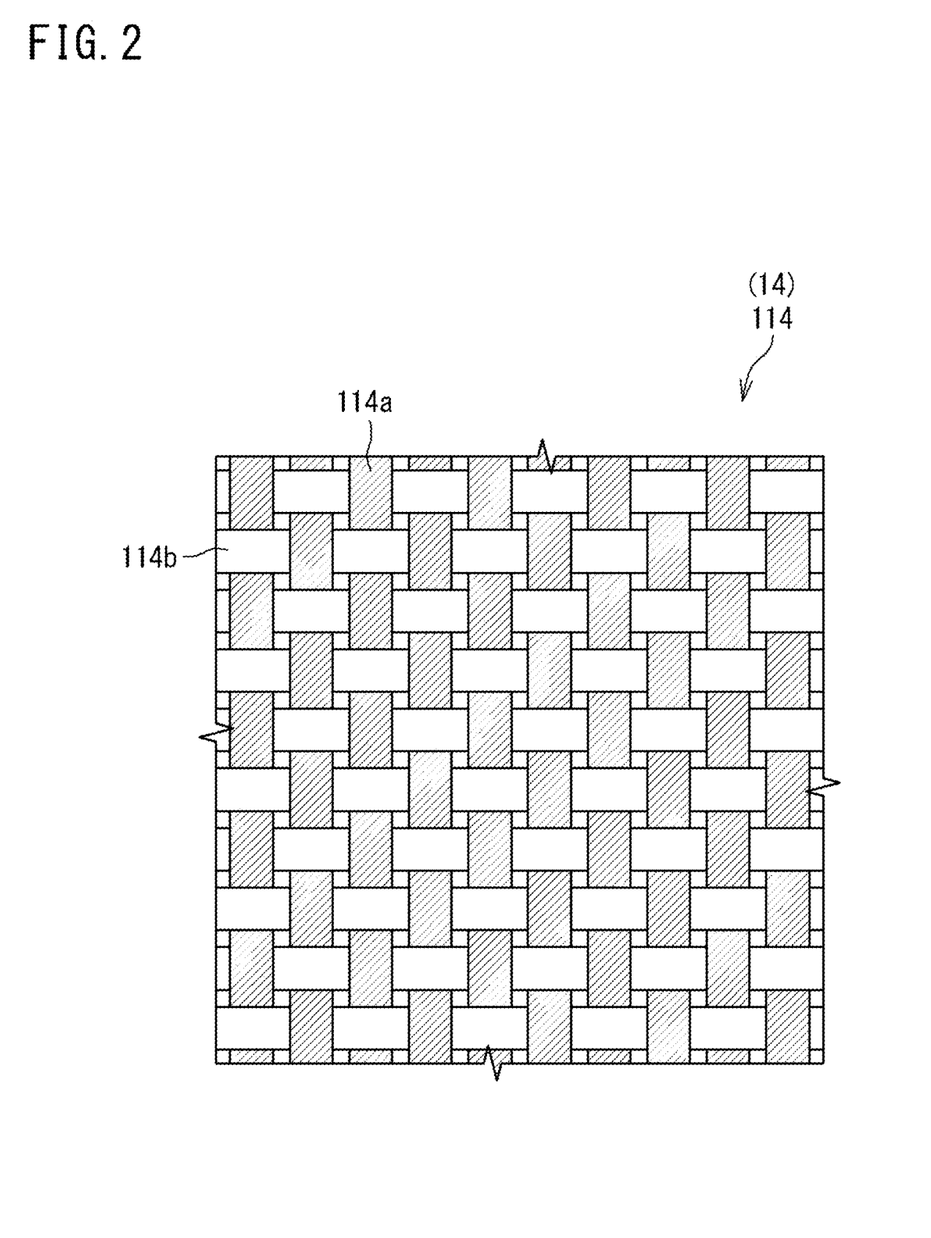
FIG. 2 illustrates a woven fabric forming a rib-side reinforcing fabric.

FIG. 2 illustrates a woven fabric 114 forming the rib-side reinforcing fabric 14.

Figure 3:
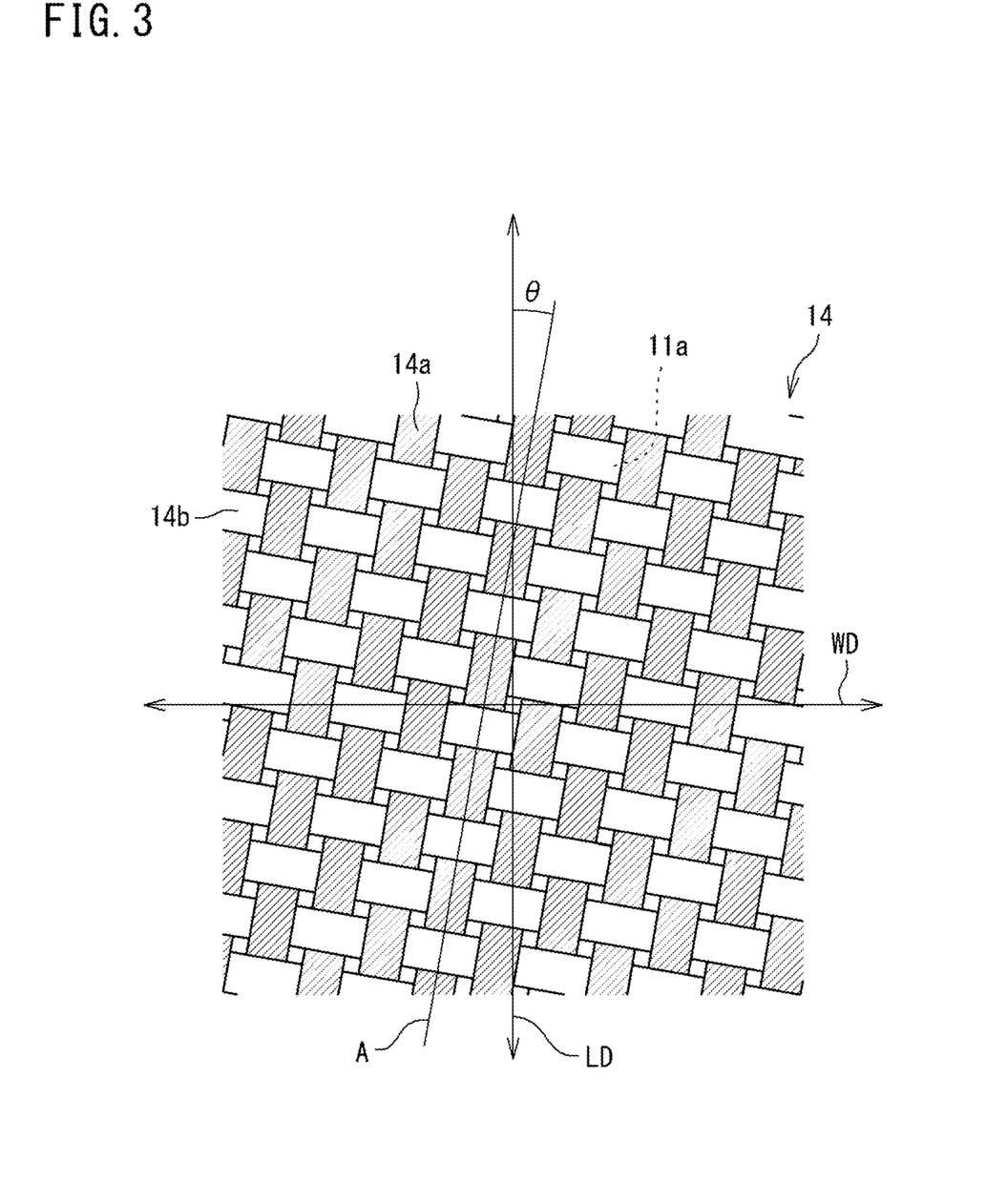
FIG. 3 is a partially enlarged view showing a part of an inner peripheral surface of the V-ribbed belt shown in FIG. 1.

FIG. 3 is a partially enlarged view showing a part of the inner peripheral surface of the V-ribbed belt B.

FIG. 2, FIG. 3, FIG. 5A, and FIG. 5B exaggerate the configuration of the woven fabric (configuration of warp and weft) for the sake of clarity.

The structure of the woven fabric 114 shown in FIG. 2 is plain weave, reference sign 114a denotes a warp, and reference sign 114b denotes a weft. The warp 114a is a thread that is more difficult to stretch than the weft 114b.

In the V-ribbed belt B, the rib-side reinforcing fabric 14 formed from the woven fabric 114 is provided so as to be inclined relative to a longitudinal direction LD of the V-ribbed belt B as shown in FIG. 3.

Specifically, the rib-side reinforcing fabric 14 covers the surface of the V-shaped rib body 11a such that an angle $\theta$ between a direction A of a warp 14a and the longitudinal direction LD (up-down direction in FIG. 3) of the V-ribbed belt B satisfies $0°<\theta<90°$. When the direction A of the warp 14a of the rib-side reinforcing fabric 14 is inclined as described above, the rib-side reinforcing fabric 14 has flexibility in each of the longitudinal direction LD and a width direction WD (right-left direction in FIG. 3) of the V-ribbed belt B and is stretchable in these directions.

The angle $\theta$ is preferably greater than 5° and not greater than 45°. If the angle $\theta$ is outside this range, it is difficult to handle the rib-side reinforcing fabric 14 such that the wrinkle-free rib-side reinforcing fabric 14 is formed in the manufacturing process.

The angle $\theta$ is more preferably not less than 10° and not greater than 45°, further preferably not less than 10° and not greater than 35°, and particularly preferably not less than 10° and not greater than 25°.

In the rib-side reinforcing fabric 14, an angle between the warp 14a and a weft 14b is 90°. Therefore, the direction of the weft 14b is preferably a direction whose angle with respect to the width direction WD of the V-ribbed belt B is greater than 5° and not greater than 45°.

In the rib-side reinforcing fabric 14, since the angle between the warp 14a and the weft 14b is 90°, the warp 14a is inclined relative to the longitudinal direction LD and the width direction WD of the belt, and the weft 14b is also inclined relative to the longitudinal direction LD and the width direction WD of the belt.

In the embodiment of the present invention, the woven fabric used for the rib-side reinforcing fabric 14 preferably has an elongation greater than 60% at 20 N/inch when being stretched at a tensile rate of 200 mm/min along a direction in which the woven fabric is more easily stretched (usually, the direction of the weft), out of the direction of the warp and the direction of the weft. The elongation when pulled under the above conditions is more preferably greater than 70% and further preferably greater than 80%.

In the embodiment of the present invention, the angle between the warp and the weft of the rib-side reinforcing fabric (woven fabric) may not necessarily be 90°.

Even in the case where a woven fabric in which the angle between the warp and the weft is not 90° is used as the rib-side reinforcing fabric, the angle $\theta$ between the direction of the warp and the longitudinal direction of the V-ribbed belt B is preferably greater than 5° and not greater than 45°. In this case, the weft may be inclined relative to both the longitudinal direction and the width direction of the belt, or may be inclined relative to only either the longitudinal direction or the width direction of the belt.

In the present invention, the fiber (warp and weft) being inclined relative to the longitudinal direction of the belt means that the direction of the fiber does not coincide with the longitudinal direction of the belt, and the fiber (warp and weft) being inclined relative to the belt width direction means that the direction of the fiber does not coincide with the belt width direction.

Examples of the structure of the woven fabric include plain weave, twill weave, sateen weave, and derivative weave thereof.

The rib-side reinforcing fabric 14 contains a cellulose-based fiber. That is, in the rib-side reinforcing fabric 14, the cellulose-based fiber is used as the warp and/or the weft of the woven fabric.

Examples of the cellulose-based fiber include cellulose fibers derived from natural plants such as wood pulp of needle-leaved trees and broad-leaved trees, bamboo fibers, sugar cane fibers, cotton fibers, and kapok seed hair fibers, bast fibers of hemp, kouzo (paper mulberry), and mitsumata (oriental paperbush), and leaf fibers of Manila hemp and New Zealand hemp; cellulose fibers derived from animals such as sea squirt cellulose; bacterial cellulose fibers; algae cellulose fibers; cellulose ester fibers; and regenerated cellulose fibers such as rayon, cupra, and lyocell.

In addition, the fibers containing the cellulose-based fiber may be a covering yarn having the cellulose-based fiber wrapped around an elastic yarn.

The fibers containing the cellulose-based fiber are preferably fibers containing cotton fiber from the viewpoint of easy availability and high practicality.

The woven fabric forming the rib-side reinforcing fabric 14 preferably contains the cellulose-based fiber as a main fiber.

The proportion of the cellulose-based fiber in the fibers contained in the woven fabric is preferably not less than 50% by mass and more preferably not less than 70% by mass, and may be 100% by mass.

The rib-side reinforcing fabric 14 may be subjected to an adhesion treatment.

Examples of the adhesion treatment include an adhesion treatment of immersion in an epoxy resin solution or an isocyanate resin solution and heating, an adhesion treatment of immersion in an RFL aqueous solution and heating, an adhesion treatment of immersion in rubber cement and drying, and an adhesion treatment of coating a surface, which is to be the compression rubber layer 11 side, with rubber cement and drying the surface. These adhesion treatments may be adopted individually, or two or more of these adhesion treatments may be adopted in combination.

The core wire 16 is embedded in an intermediate portion in the belt thickness direction of the adhesive rubber layer 12 so as to form a helical pattern having a pitch in the belt width direction.

The core wire 16 is formed from a twisted yarn made of polyamide fiber, polyester fiber, aramid fiber, or the like. The diameter of the core wire 16 is, for example, not less than 0.5 mm and not greater than 2.5 mm, and the dimension between centers of the core wires 16 adjacent to each other in a cross-section is, for example, not less than 0.05 mm and not greater than 0.20 mm.

The core wire 16 is preferably subjected to one or more of an adhesion treatment of immersing the core wire 16 in an epoxy resin solution or an isocyanate resin solution and heating the core wire 16, an adhesion treatment of immersing the core wire 16 in an RFL aqueous solution and then heating the core wire 16, and an adhesion treatment of immersing the core wire 16 in rubber cement and then drying the core wire 16.

Next, a method for manufacturing the V-ribbed belt B will be described with reference to the drawings.

Figure 4A:
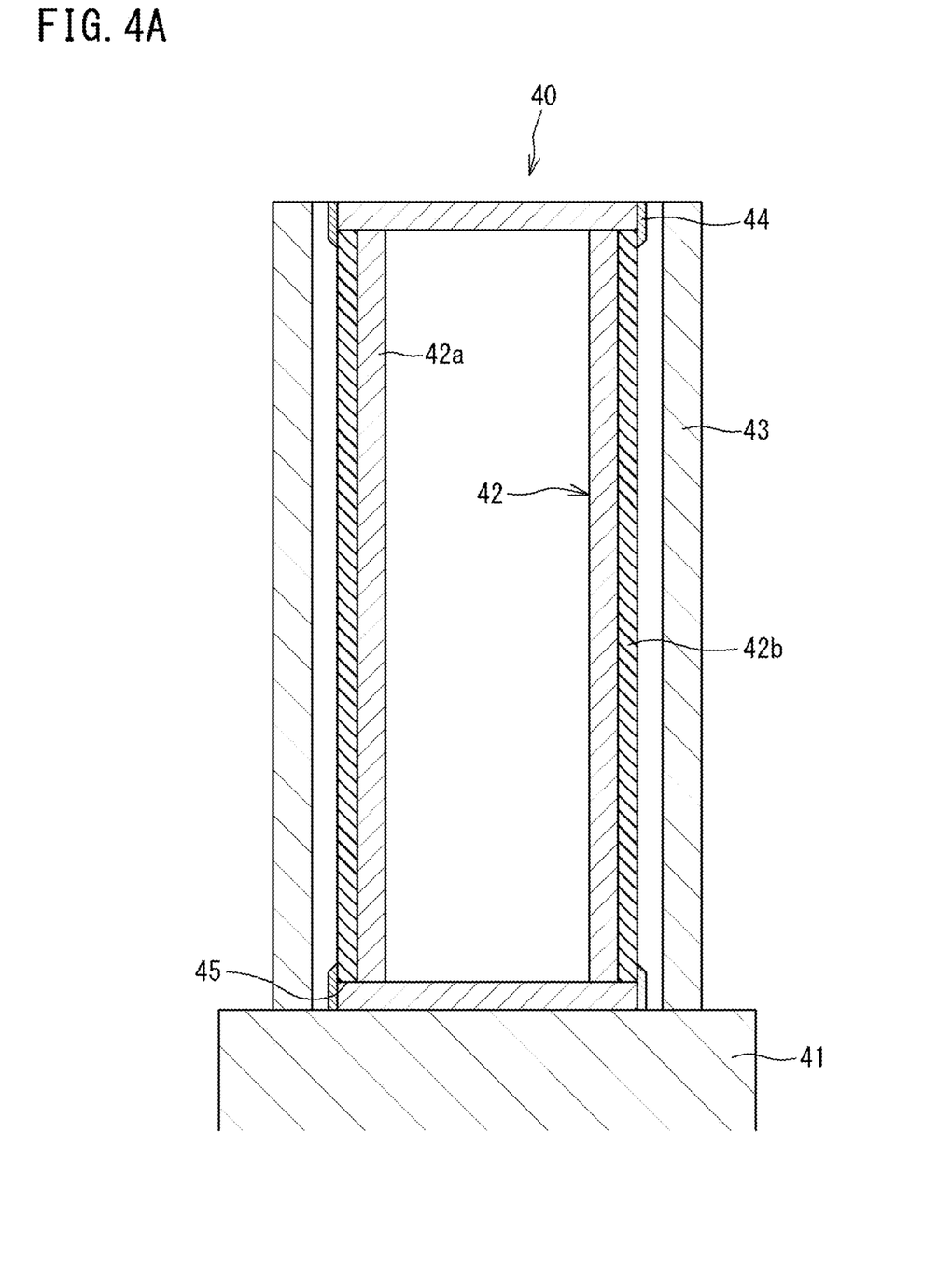
FIG. 4A is a cross-sectional view of a crosslinking device.
Figure 4B:
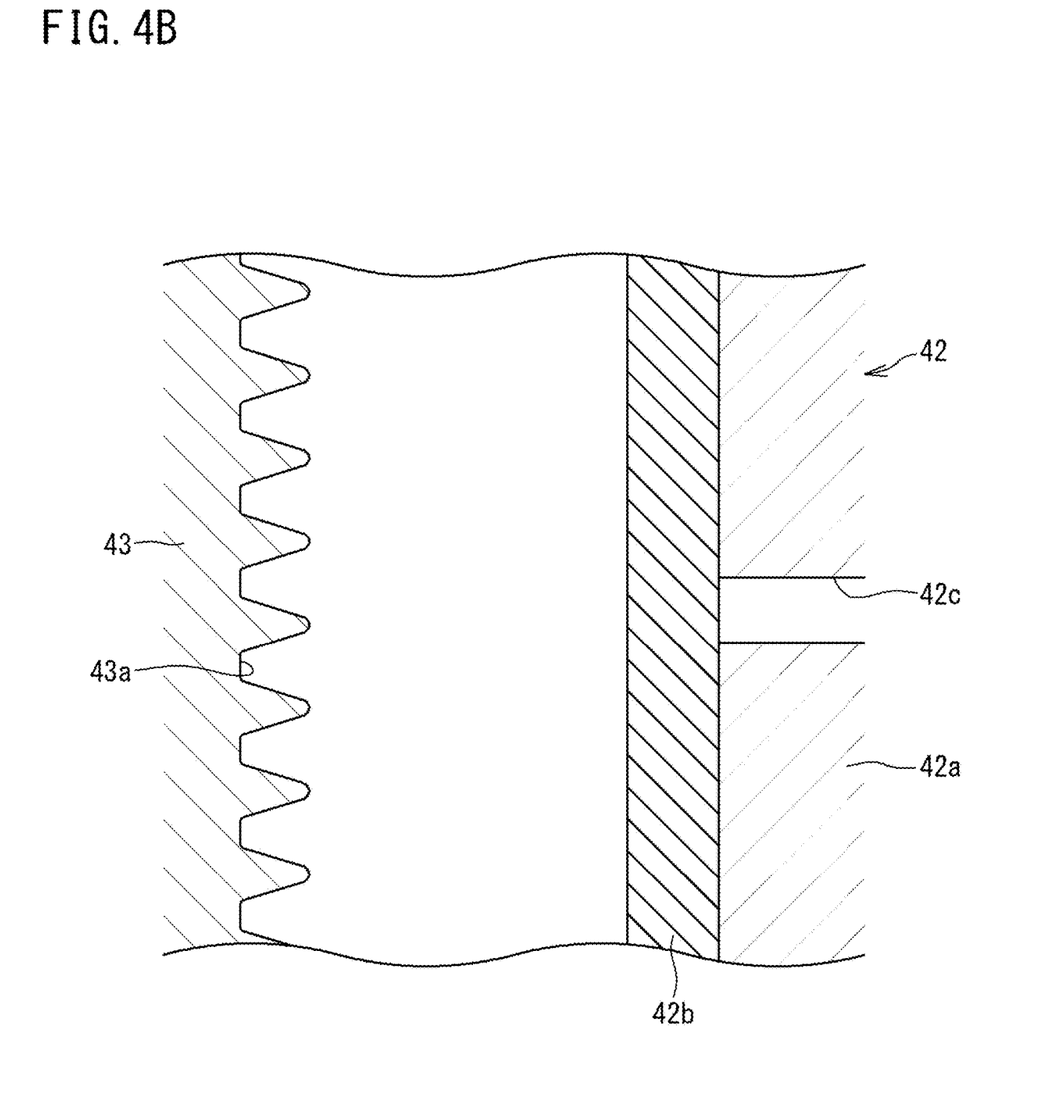
FIG. 4B is an enlarged cross-sectional view of a part of the crosslinking device shown in FIG. 4A.
Figure 5A:
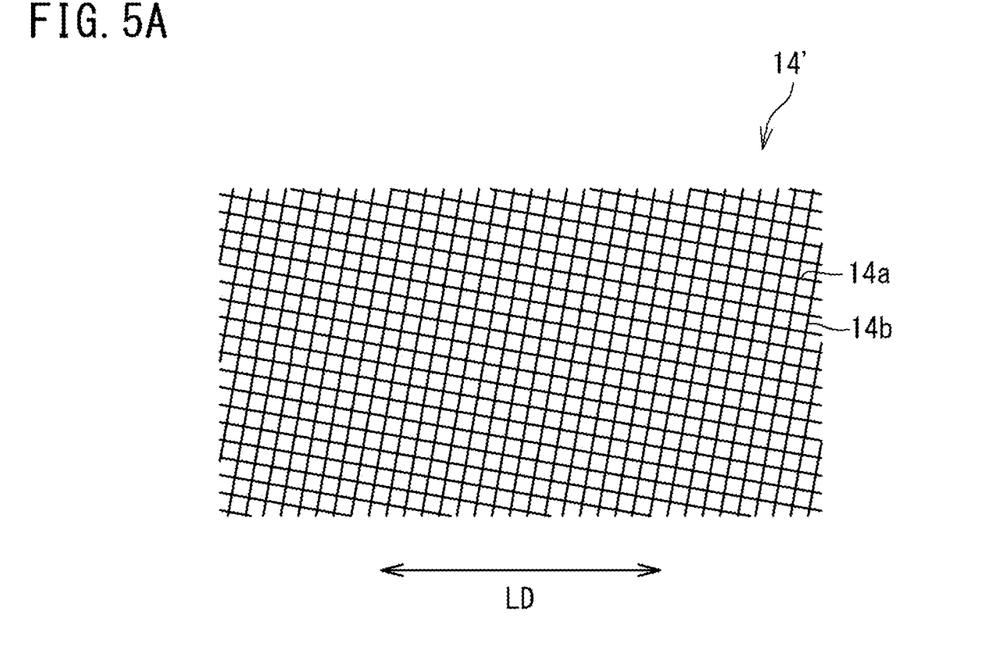
FIG. 5A and FIG. 5B are each a diagram for illustrating a method for preparing a rib-side reinforcing fabric formed in a tubular shape.
Figure 5B:
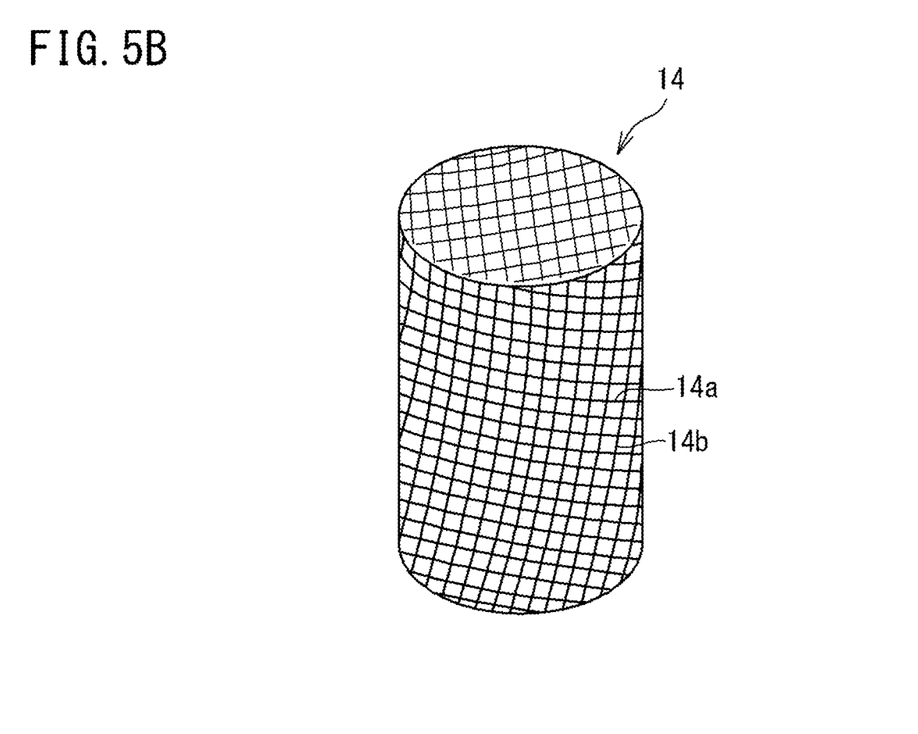
Figure 6A:
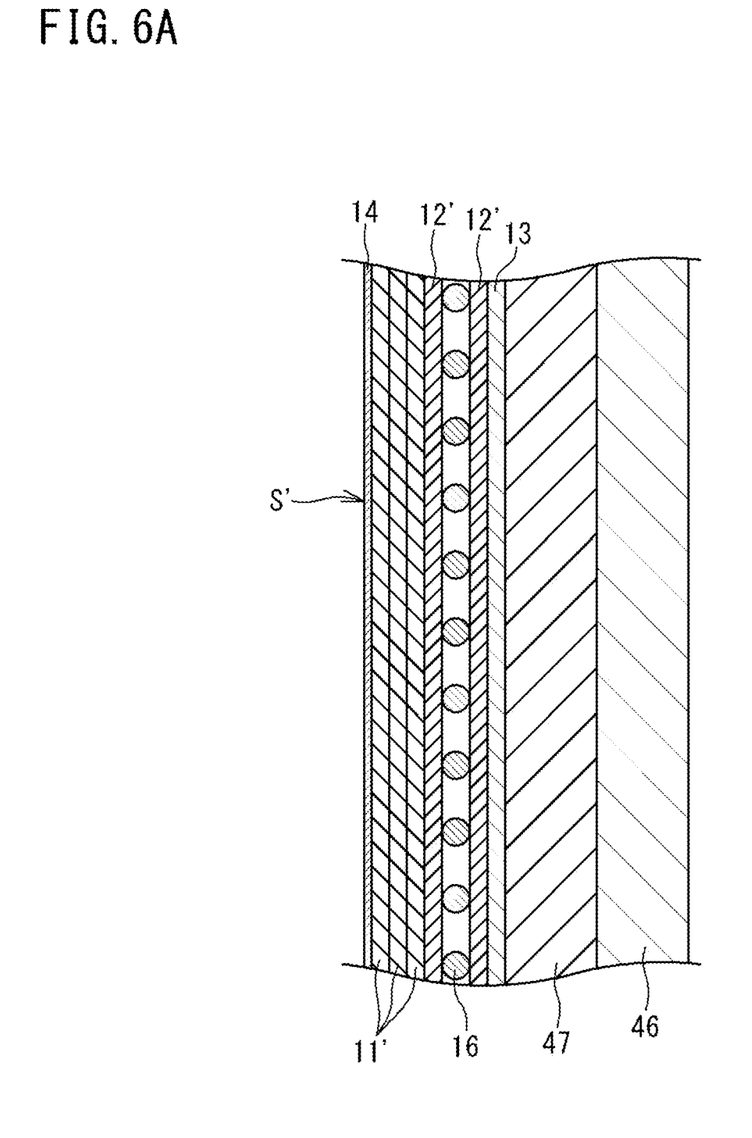
FIG. 6A is a diagram for illustrating a method for manufacturing the V-ribbed belt shown in FIG. 1.
Figure 6B:
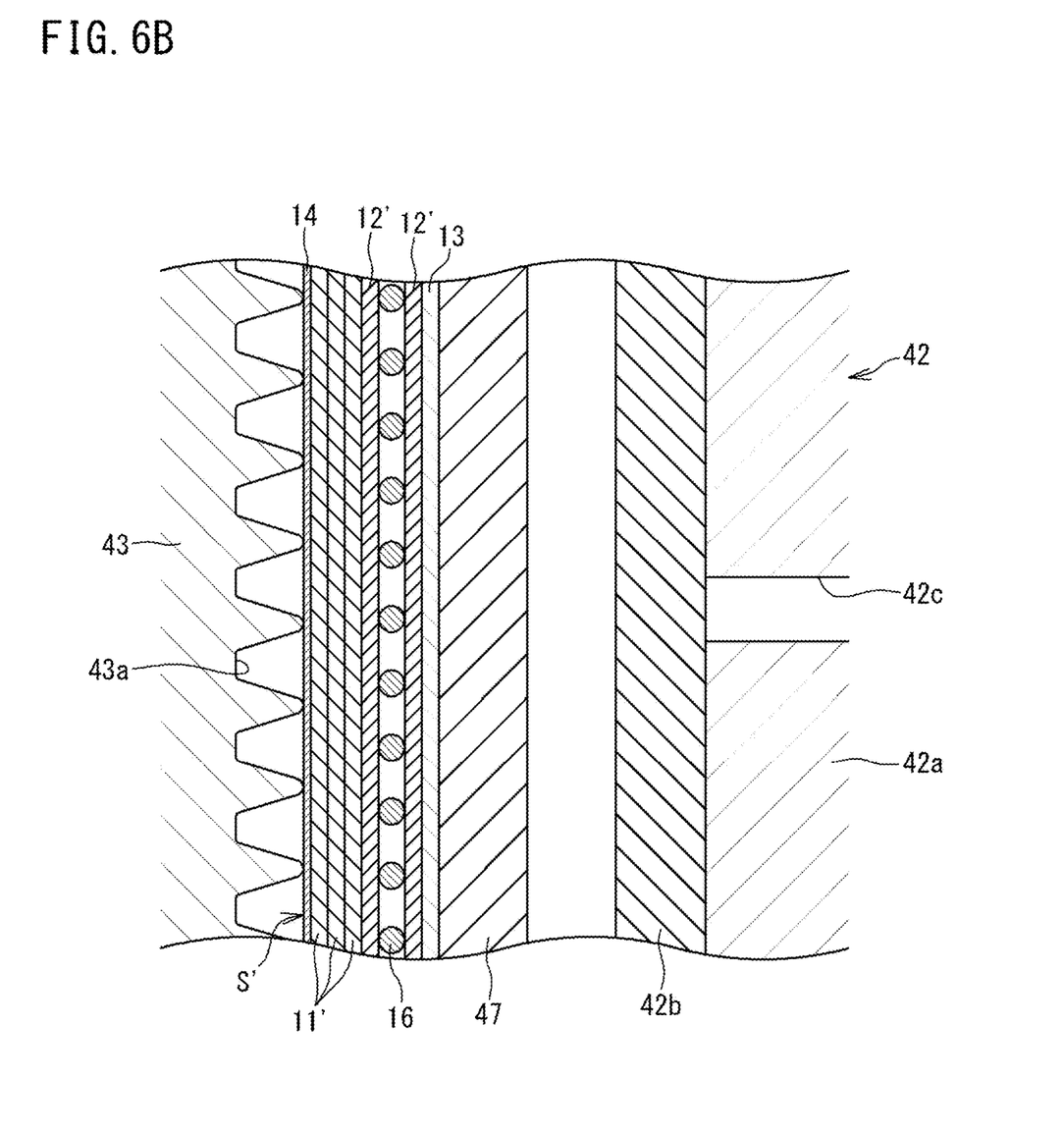
FIG. 6B is a diagram for illustrating the method for manufacturing the V-ribbed belt shown in FIG. 1.
Figure 6C:
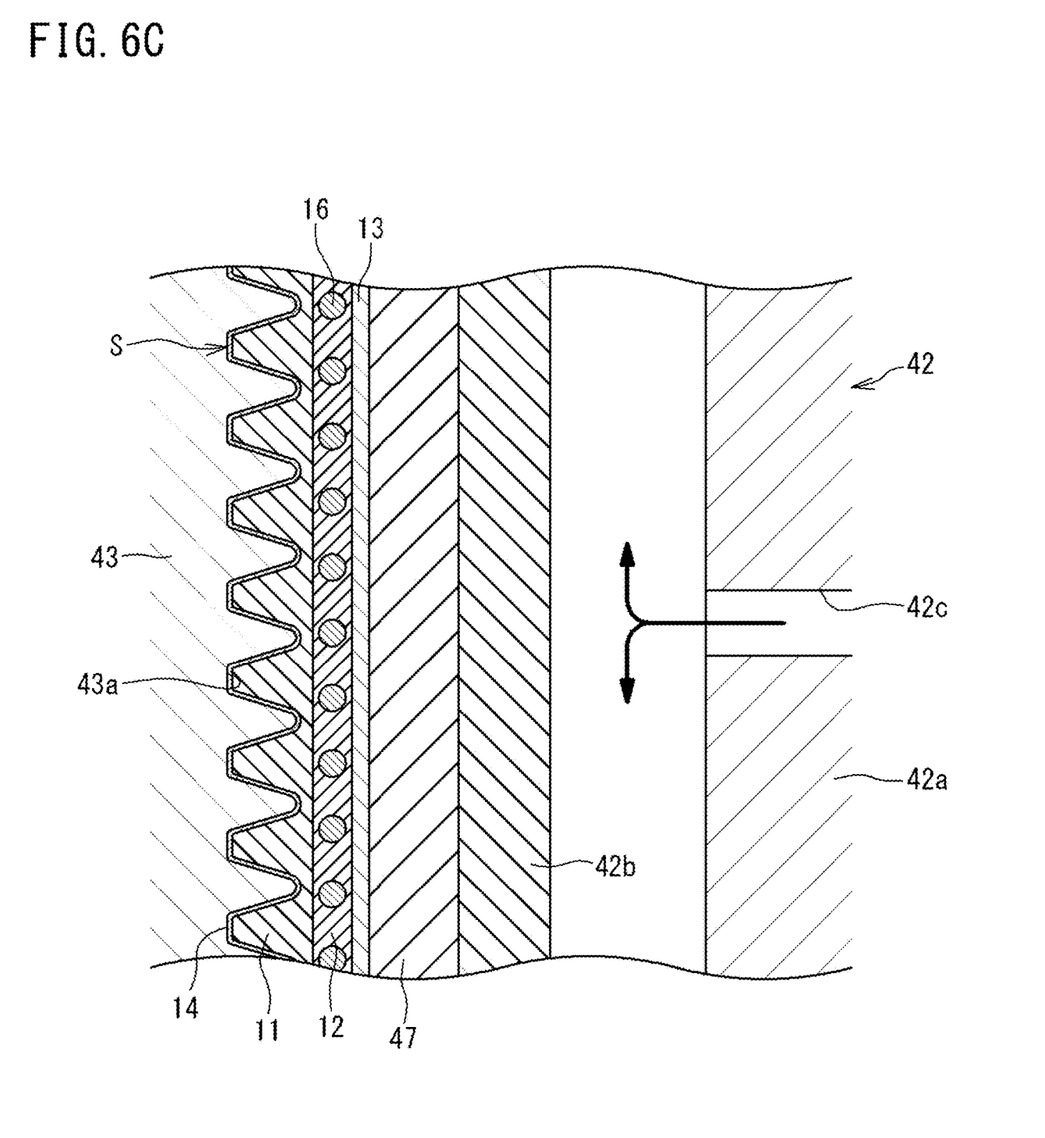
FIG. 6C is a diagram for illustrating the method for manufacturing the V-ribbed belt shown in FIG. 1.

FIG. 4A and FIG. 4B illustrate a crosslinking device 40 used for manufacturing the V-ribbed belt B according to the present embodiment. FIG. 5A and FIG. 5B are each a diagram for illustrating a method for preparing a rib-side reinforcing fabric formed in a tubular shape. FIG. 6A to FIG. 6C are each a diagram for illustrating the method for manufacturing the V-ribbed belt B according to the present embodiment.

The crosslinking device 40 includes a base 41, a columnar expansion drum 42 erected on the base 41, and a cylindrical mold 43 provided outside the expansion drum 42.

The expansion drum 42 has a drum body 42a formed in a hollow columnar shape, and a cylindrical expansion sleeve 42b made of rubber and fitted on the outer periphery of the drum body 42a. A large number of ventilation holes 42c are formed on an outer peripheral portion of the drum body 42a so as to communicate with the interior of the drum body 42a. Both end portions of the expansion sleeve 42b are sealed by fixing rings 44 and 45 between the drum body 42a and the expansion sleeve 42b, respectively. The crosslinking device 40 is provided with pressurizing means (not shown) for introducing high-pressure air into the drum body 42a to pressurize the interior of the drum body 42a. The crosslinking device 40 is configured such that when the high-pressure air is introduced into the drum body 42a by the pressurizing means, the high-pressure air passes through the ventilation holes 42c and enters between the drum body 42a and the expansion sleeve 42b to expand the expansion sleeve 42b radially outward.

The cylindrical mold 43 is configured to be attachable to and removable from the base 41. The cylindrical mold 43 attached to the base 41 is provided concentrically with the expansion drum 42 at an interval from the expansion drum 42. The cylindrical mold 43 is provided with a plurality of V-shaped rib forming grooves 43a formed on the inner peripheral surface thereof so as to extend in the circumferential direction and be aligned in the axial direction (groove width direction). Each V-shaped rib forming groove 43a is formed so as to be narrower toward the groove bottom side. Specifically, each V-shaped rib forming groove 43a is formed such that a cross-sectional shape thereof is the same as that of the V-shaped rib 15 of the V-ribbed belt B to be manufactured. The crosslinking device 40 is provided with heating means and cooling means (both not shown) for the cylindrical mold 43. The crosslinking device 40 is configured such that it is possible to control the temperature of the cylindrical mold 43 by the heating means and the cooling means.

In the method for manufacturing the V-ribbed belt B according to the embodiment, first, the rubber compounding ingredients including the crosslinking agent are blended with the rubber component and kneaded with a kneading machine such as a kneader or a Banbury mixer, and the obtained uncrosslinked rubber composition is formed into a sheet shape by calendar molding or the like to produce an uncrosslinked rubber sheet 11' for the compression rubber layer 11. Similarly, an uncrosslinked rubber sheet 12' for the adhesive rubber layer 12 is also produced. In addition, the rib-side reinforcing fabric 14 formed from a woven fabric and the backface reinforcing fabric 13 formed from a woven fabric, a knitted fabric, or the like are prepared, and an adhesion treatment is performed thereon as necessary. The rib-side reinforcing fabric 14 is preferably formed in a tubular shape in advance. Moreover, the backface reinforcing fabric 13 may also be formed in a tubular shape in advance. Furthermore, the core wire 16 is prepared, and an adhesion treatment is performed on the core wire 16 as necessary.

The rib-side reinforcing fabric formed in a tubular shape can be produced, for example, by the following method.

FIG. 5A and FIG. 5B are each a diagram for illustrating a method for preparing a rib-side reinforcing fabric formed in a tubular shape.

First, the woven fabric 114 is cut into a rectangular shape to form a strip-shaped rib-side reinforcing fabric 14'. At this time, the woven fabric 114 is cut such that the direction of the warp is inclined relative to the long side direction (longitudinal direction LD of the completed V-ribbed belt) at a predetermined angle, for example, at an angle of greater than 5° and not greater than 45° (see FIG. 5A).

Thereafter, the two short sides of the strip-shaped rib-side reinforcing fabric 14' are abutted to each other and sewn to form the tubular rib-side reinforcing fabric 14 (see FIG. 5B).

Such a tubular rib-side reinforcing fabric 14 is suitable for use for manufacturing the V-ribbed belt B by using the crosslinking device 40.

Next, as shown in FIG. 6A, a rubber sleeve 47 is placed on a cylindrical drum 46 having a smooth surface, and the backface reinforcing fabric 13 and the uncrosslinked rubber sheet 12' for the adhesive rubber layer 12 are wrapped in this order and stacked over the rubber sleeve 47. The core wire 16 is helically wound over the uncrosslinked rubber sheet 12', and the uncrosslinked rubber sheet 12' for the adhesive rubber layer 12 and the uncrosslinked rubber sheet 11' for the compression rubber layer 11 are further wrapped in this order over the core wire 16. Finally, the rib-side reinforcing fabric 14 formed in a tubular shape by the above-described method is placed over the uncrosslinked rubber sheet 11' to form an uncrosslinked slab S'.

At this time, by placing the tubular rib-side reinforcing fabric 14 over the uncrosslinked rubber sheet 11' while adjusting the tension state thereof to be uniform, occurrence of wrinkles in the rib-side reinforcing fabric 14 is suppressed in a molded belt slab S.

In the manufacturing method of the present embodiment, the strip-shaped rib-side reinforcing fabric 14' may be wrapped over the uncrosslinked rubber sheet 11' for the compression rubber layer 11.

In addition, when wrapping the rib-side reinforcing fabric, the rib-side reinforcing fabric may be molded in a bellows shape in advance such that the rib-side reinforcing fabric easily follows the shapes of the V-shaped rib forming grooves 43a, and this rib-side reinforcing fabric may be wrapped over the uncrosslinked rubber sheet 11'. In this case, in the molded belt slab S, it becomes easier to avoid occurrence of wrinkles in the rib-side reinforcing fabric.

Then, the rubber sleeve 47 on which the uncrosslinked slab S' has been provided is removed from the cylindrical drum 46. As shown in FIG. 6B, the rubber sleeve 47 is fitted into the inner peripheral surface side of the cylindrical mold 43, and then the cylindrical mold 43 on which the uncrosslinked slab S' has been provided is attached to the base 41 so as to cover the expansion drum 42.

Subsequently, while heating the cylindrical mold 43, as shown in FIG. 6C, high-pressure air is injected between the drum body 42a and the expansion sleeve 42b of the expansion drum 42 through the ventilation holes 42c to expand the expansion sleeve 42b. At this time, the uncrosslinked slab S' is pressed against the cylindrical mold 43, the uncrosslinked rubber sheets 11' and 12' enter the V-shaped rib forming grooves 43a while pressing and stretching the rib-side reinforcing fabric 14, and crosslinking of the rubber components of the uncrosslinked rubber sheets 11' and 12' proceeds to integrate the uncrosslinked rubber sheets 11' and 12' and combine the uncrosslinked rubber sheets 11' and 12' with the rib-side reinforcing fabric 14, the core wire 16, and the backface reinforcing fabric 13. Finally, a cylindrical belt slab S is molded. The molding temperature of the belt slab S is, for example, not lower than 100° C. and not higher than 180° C., the molding pressure of the belt slab S is, for example, not lower than 0.5 MPa and not higher than 2.0 MPa, and the molding time of the belt slab S is, for example, not shorter than 10 minutes and not longer than 60 minutes.

Then, the high-pressure air is removed from between the drum body 42a and the expansion sleeve 42b of the expansion drum 42. Then, the belt slab S molded on the inner peripheral surface of the cylindrical mold 43 is taken out, the belt slab S is cut into round slices each having a predetermined number of V-shaped ribs 15, and each round slice is turned inside out, whereby the V-ribbed belt B is obtained.

EXAMPLES

Hereinafter, the present invention will be more specifically described by means of examples, but the present invention is not limited to the examples below.

Here, V-ribbed belts of Examples 1 to 4 and Comparative Examples 1 and 2 were produced using a rib-side reinforcing fabric described below. The obtained V-ribbed belts were evaluated.

<Woven Fabric a Used as Rib-Side Reinforcing Fabric>

As a woven fabric used as a rib-side reinforcing fabric, a plain weave woven fabric A in which a cotton spun yarn was used as a warp and a covering yarn having cotton wrapped around an elastic yarn was used as a weft, was prepared.

The woven fabric A had an elongation of 77% along the direction of the weft and an elongation of 6% along the direction of the warp at 20 N/inch when being stretched at a tensile rate of 200 mm/min.

<Knitted Fabric B Used as Rib-Side Reinforcing Fabric>

A knitted fabric formed with a cotton spun yarn as a knitting yarn and not subjected to an adhesion treatment of immersion in an adhesive was prepared.

The knitted fabric B had an elongation of 183% along the wale direction and an elongation of 191% along the course direction at 20 N/inch when being stretched at a tensile rate of 200 mm/min.

<Compression Rubber Material/Adhesive Rubber Material>

An uncrosslinked rubber composition obtained by blending rubber compounding ingredients including EPDM and sulfur was kneaded and then rolled with a calendar roll to produce an uncrosslinked rubber sheet for a compression rubber and an uncrosslinked rubber sheet for an adhesive rubber.

<Core Wire>

A twisted yarn made of polyester fibers was prepared, and an adhesion treatment of immersing the yarn in an RFL aqueous solution and then heating and drying the yarn was performed on the twisted yarn, to prepare a core wire.

<Backface Reinforcing Fabric>

The knitted fabric B, which was prepared as a rib-side reinforcing fabric, was subjected to an RFL treatment to obtain a backface reinforcing fabric.

Example 1

A V-ribbed belt that has the same configuration as described above in the embodiment and in which the woven fabric A was used as a rib-side reinforcing fabric and the above-described ones were used as a compression rubber material, an adhesive rubber material, a core wire, and a backface reinforcing fabric, was produced by the manufacturing method described with reference to FIG. 4A to FIG. 6C, and was regarded as a V-ribbed belt of Example 1. Here, a V-ribbed belt having three V-shaped ribs was produced.

In this Example, the woven fabric A sewn into a tubular shape in advance such that the angle formed by the direction of the warp and the longitudinal direction of the belt was 10° after belt molding, was used as the rib-side reinforcing fabric.

Example 2

A V-ribbed belt was produced in the same manner as Example 1, except that the woven fabric A sewn into a tubular shape in advance such that the angle formed by the direction of the warp and the longitudinal direction of the belt was 20° after belt molding, was used as the rib-side reinforcing fabric.

Example 3

A V-ribbed belt was produced in the same manner as Example 1, except that the woven fabric A sewn into a tubular shape in advance such that the angle formed by the direction of the warp and the longitudinal direction of the belt was 5° after belt molding, was used as the rib-side reinforcing fabric.

Example 4

A V-ribbed belt was produced in the same manner as Example 1, except that the woven fabric A sewn into a tubular shape in advance such that the angle formed by the direction of the warp and the longitudinal direction of the belt was 50° after belt molding, was used as the rib-side reinforcing fabric.

Comparative Example 1

A V-ribbed belt was produced in the same manner as Example 1, except that the woven fabric A sewn into a tubular shape in advance such that the angle formed by the direction of the warp and the longitudinal direction of the belt was 0° (the direction of the warp and the longitudinal direction of the belt coincided with each other) after belt molding, was used as the rib-side reinforcing fabric.

Comparative Example 2

A V-ribbed belt was produced in the same manner as Example 1, except that the knitted fabric B was used as the rib-side reinforcing fabric.

In this Comparative Example, the knitted fabric B sewn into a tubular shape in advance such that the course direction thereof and the longitudinal direction of the belt after belt molding coincided with each other, was used as the rib-side reinforcing fabric.

<Evaluation of Moldability of Rib-Side Reinforcing Fabric>

The moldability of the rib-side reinforcing fabric was evaluated based on the following criteria. The results are shown in Table 1.

A: The flexibility required for work was ensured and molding was successfully performed without problems.

B: The flexibility was low and it was difficult to handle the rib-side reinforcing fabric but molding was successfully performed.

C: The rib-side reinforcing fabric did not follow the shape of the V-shaped rib body and wrinkles occurred.

<Wear Durability Test>

Figure 7:
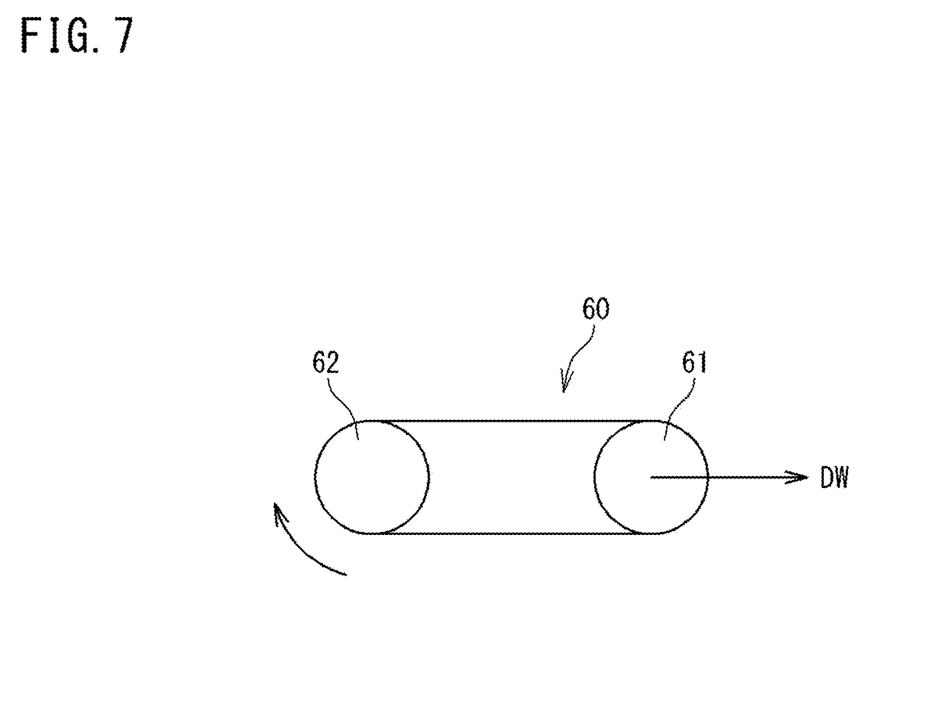
FIG. 7 illustrates a layout of pulleys of a belt durability tester in a wear durability test.

FIG. 7 illustrates a layout of pulleys of a belt durability tester 60 in a wear durability test.

In the belt durability tester 60, a driving pulley 61 which is a rib pulley having a pulley diameter of 60 mm is provided on the right side, and a driven pulley 62 which is a rib pulley having a pulley diameter of 60 mm is provided on the left side. The driving pulley 61 is provided so as to be movable right and left, and is configured to be able to apply an axial load. A rotational load of 3.8 kW (5.2 PS) is applied to the driven pulley 62.

The V-ribbed belt B of each of Example 1 and Comparative Example 2 was trained around the driving pulley 61 and the driven pulley 62 such that the V-shaped rib side thereof was in contact with these pulleys, an axial load DW of 1176 N was applied rightward to the driving pulley 61 to apply belt tension, and the driving pulley 61 was rotated at a rotation speed of 3500 rpm at room temperature to cause the belt to run for 170 hours. Then, the mass change before and after belt running was obtained, and a wear rate was calculated with the mass change as a wear weight loss. The results are shown in Table 1.

TABLE 1

|  | Example | | | | Comparative Example | |
| --- | --- | --- | --- | --- | --- | --- |
|  | 1 | 2 | 3 | 4 | 1 | 2 |
| Rib-side reinforcing fabric | Woven fabric | Woven fabric | Woven fabric | Woven fabric | Woven fabric | Knitted fabric |
| Angle between warp direction or course direction and longitudinal direction of belt [°] | 10 | 20 | 5 | 50 | 0 | 0 |
| Moldability | A | A | B | B | C | A |
| Wear amount [% by mass] | 1.2 | — | — | — | — | 3.3 |

From the results of Examples and Comparative Examples, the following matters were clarified.

In Examples 1 and 2, since the woven fabric had moderate flexibility in the circumferential direction and the width direction of the belt and was easy to stretch in both directions, there was no problem with moldability.

In Example 3, since the flexibility in the belt circumferential direction of the woven fabric was low, it was difficult to handle the woven fabric when covering with the woven fabric, but a belt having no wrinkle in the rib-side reinforcing fabric was molded by covering with the woven fabric while adjusting the tension state of the woven fabric to be uniform.

In Example 4, since the flexibility in the belt width direction of the woven fabric was low, molding to the rib shape was difficult, but a belt having no wrinkle in the rib-side reinforcing fabric was produced by covering with the woven fabric while adjusting the tension state of the woven fabric to be uniform.

Regarding Comparative Example 1, since the flexibility in the belt circumferential direction of the woven fabric was very low, it was very difficult to cover the uncrosslinked rubber sheet 11' with the woven fabric. In addition, when molding, a portion having an extra length in the belt circumferential direction was generated, so that the fitting of the woven fabric to the rib shape was poor, which caused wrinkles after molding.

INDUSTRIAL APPLICABILITY

The V-ribbed belt according to the present invention is useful, for example, for an auxiliary mechanism driving belt transmission device of an automobile, and the like.

REFERENCE SIGNS LIST 10 belt body
11 compression rubber layer
11a V-shaped rib body
12 adhesive rubber layer
13 backface reinforcing fabric 14 rib-side reinforcing fabric
14a, 114a warp
14b, 114b weft
15 V-shaped rib
16 core wire
40 crosslinking device
60 durability tester
11', 12' uncrosslinked rubber sheet
114 woven fabric
B V-ribbed belt

The invention claimed is:

1. A V-ribbed belt comprising a plurality of V-shaped ribs, wherein
   each of the plurality of V-shaped ribs includes a V-shaped rib body formed from a rubber composition and a rib-side reinforcing fabric covering a surface of the V-shaped rib body on the belt inner peripheral side such that the rib-side reinforcing fabric is inclined relative to a longitudinal direction of the belt,
      the rib-side reinforcing fabric is a woven fabric containing a first fiber and a second fiber,
      at least the first fiber is inclined relative to the longitudinal direction of the belt, and
      an angle of a direction of the first fiber with respect to the longitudinal direction of the belt is not less than 10° and not greater than 25°.

2. The V-ribbed belt according to claim 1, wherein the first fiber is more difficult to stretch than the second fiber.

3. The V-ribbed belt according to claim 1, wherein the rib-side reinforcing fabric has a thickness of not less than 0.1 mm and not greater than 0.8 mm.

4. The V-ribbed belt according to claim 2, wherein the rib-side reinforcing fabric has a thickness of not less than 0.1 mm and not greater than 0.8 mm.

5. The V-ribbed belt according to claim 1, wherein the woven fabric contains a cellulose-based fiber as a main fiber.

6. The V-ribbed belt according to claim 2, wherein the woven fabric contains a cellulose-based fiber as a main fiber.

7. The V-ribbed belt according to claim 3, wherein the woven fabric contains a cellulose-based fiber as a main fiber.

8. The V-ribbed belt according to claim 1, wherein at least one of the first fiber and the second fiber is a cellulose-based fiber or a covering yarn having the cellulose-based fiber wrapped around an elastic yarn.

9. A V-ribbed belt comprising a plurality of V-shaped ribs, wherein
   each of the plurality of V-shaped ribs includes a V-shaped rib body formed from a rubber composition and a rib-side reinforcing fabric covering a surface of the V-shaped rib body on the belt inner peripheral side,
   the rib-side reinforcing fabric is a woven fabric containing a first fiber and a second fiber, wherein at least one of the first fiber and the second fiber is a cellulose-based fiber or a covering yarn having the cellulose-based fiber wrapped around an elastic yarn, and
   in the woven fabric, at least either the first fiber or the second fiber is inclined relative to a longitudinal direction and a width direction of the belt, and
      an angle of a direction of the first fiber with respect to the longitudinal direction of the belt is not less than 10° and not greater than 25°.

* * * * *